(12) United States Patent
Yates

(10) Patent No.: US 9,623,711 B2
(45) Date of Patent: Apr. 18, 2017

(54) TIRE PRE-INFLATOR SYSTEM

(71) Applicant: Kirk M. Yates, Dunedin, FL (US)

(72) Inventor: Kirk M. Yates, Dunedin, FL (US)

(73) Assignee: Kirk M. Yates, Dunedin, FL (US)

( * ) Notice: Subject to any disclaimer, the term of this patent is extended or adjusted under 35 U.S.C. 154(b) by 283 days.

(21) Appl. No.: 14/325,334

(22) Filed: Jul. 7, 2014

(65) Prior Publication Data
US 2015/0013919 A1 Jan. 15, 2015

Related U.S. Application Data

(60) Provisional application No. 61/843,563, filed on Jul. 8, 2013.

(51) Int. Cl.
*B60C 25/14* (2006.01)

(52) U.S. Cl.
CPC .................... *B60C 25/145* (2013.04)

(58) Field of Classification Search
CPC ................................................ B60C 25/145
See application file for complete search history.

(56) References Cited

U.S. PATENT DOCUMENTS

| | | | | | |
|---|---|---|---|---|---|
| 2,913,035 A | * | 11/1959 | Lapin | ............. | B60C 25/145 152/415 |
| 3,024,831 A | * | 3/1962 | McConkie | ............. | B60C 25/145 152/415 |
| 3,596,698 A | * | 8/1971 | Jordan | ............. | B60C 25/145 157/1.1 |
| 3,658,109 A | * | 4/1972 | Kaminskas | ............. | B60C 25/145 157/1.1 |
| 3,739,829 A | * | 6/1973 | Powell | ............. | B29C 73/163 152/378 R |
| 3,866,654 A | * | 2/1975 | Duquesne | ............. | B60C 25/145 137/223 |
| 3,945,419 A | * | 3/1976 | Kosanke | ............. | B60B 11/10 152/158 |
| 4,019,553 A | * | 4/1977 | Lefgren | ............. | B60C 25/145 157/1.1 |
| 4,498,516 A | * | 2/1985 | Parker | ............. | B60C 25/145 157/1.1 |
| 4,506,719 A | * | 3/1985 | Gaither | ............. | B60C 25/145 157/1.1 |
| 4,699,185 A | * | 10/1987 | Cargould | ............. | B60C 25/145 141/1 |
| 5,364,463 A | * | 11/1994 | Hull | ............. | B29C 73/163 106/197.01 |
| 9,346,331 B2 | * | 5/2016 | Lundberg | ............. | B60C 25/12 157/1.1 |

* cited by examiner

*Primary Examiner* — David B Thomas
(74) *Attorney, Agent, or Firm* — Joseph Kincart; Ideation Law, PLLC

(57) ABSTRACT

The present invention provides for a tire pre-inflator to assist in mounting a tire on a tire rim. The pre-inflator includes a bladder that may be positioned within a tire prior to mounting and a bladder filling insert that extends through a valve stem mounted in the rim.

7 Claims, 7 Drawing Sheets

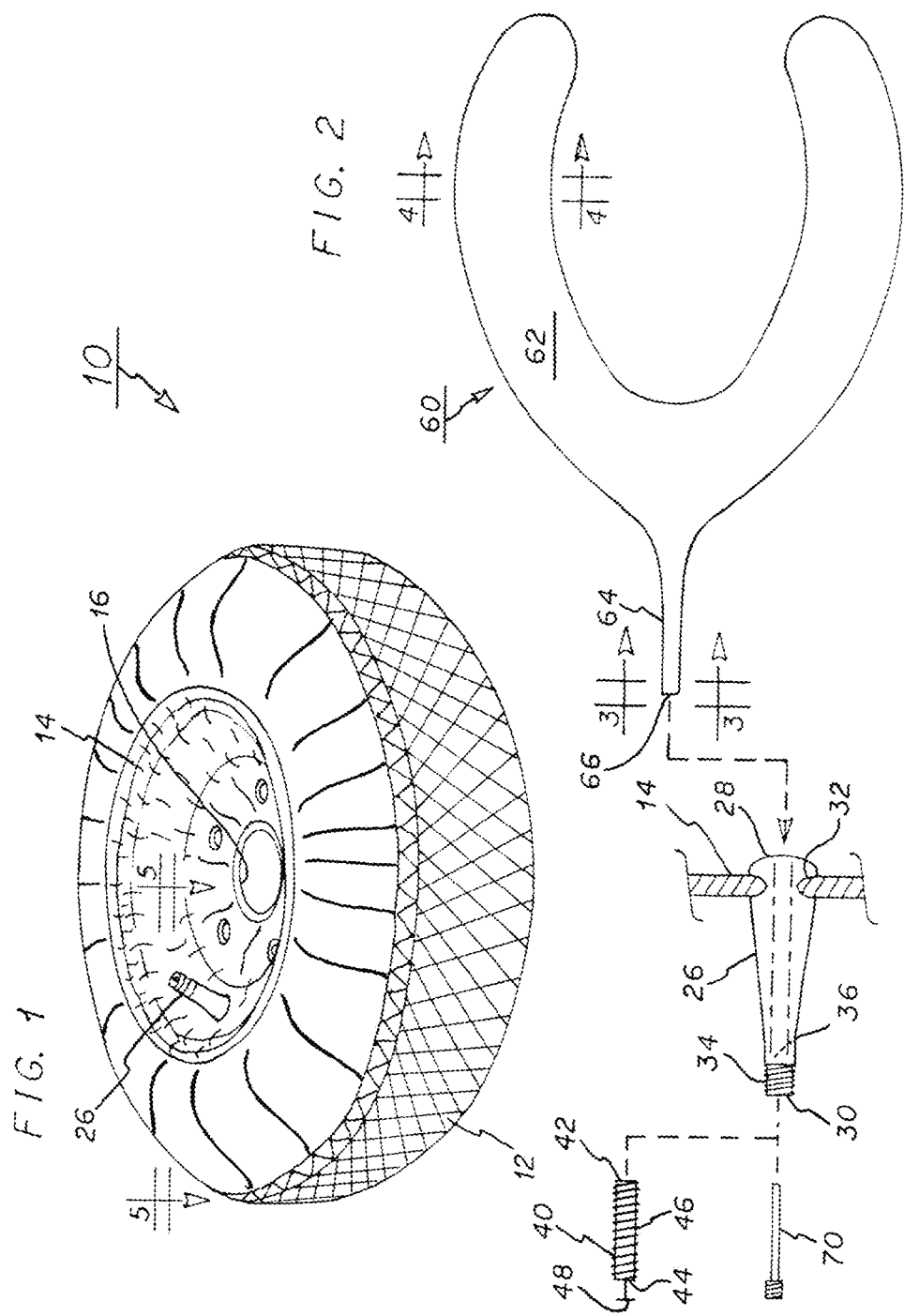

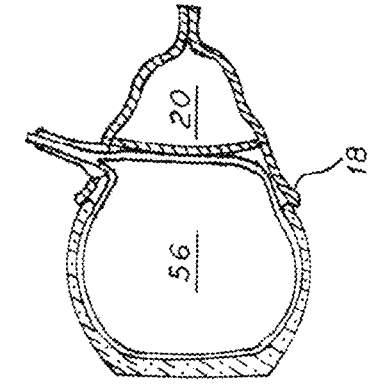
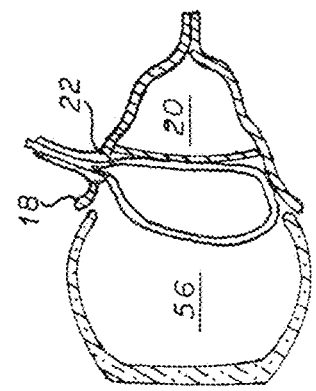
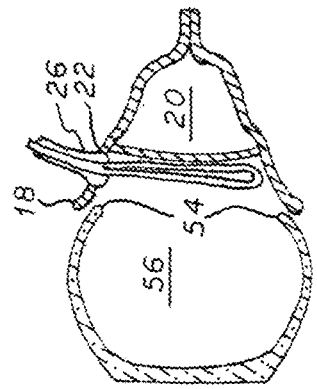

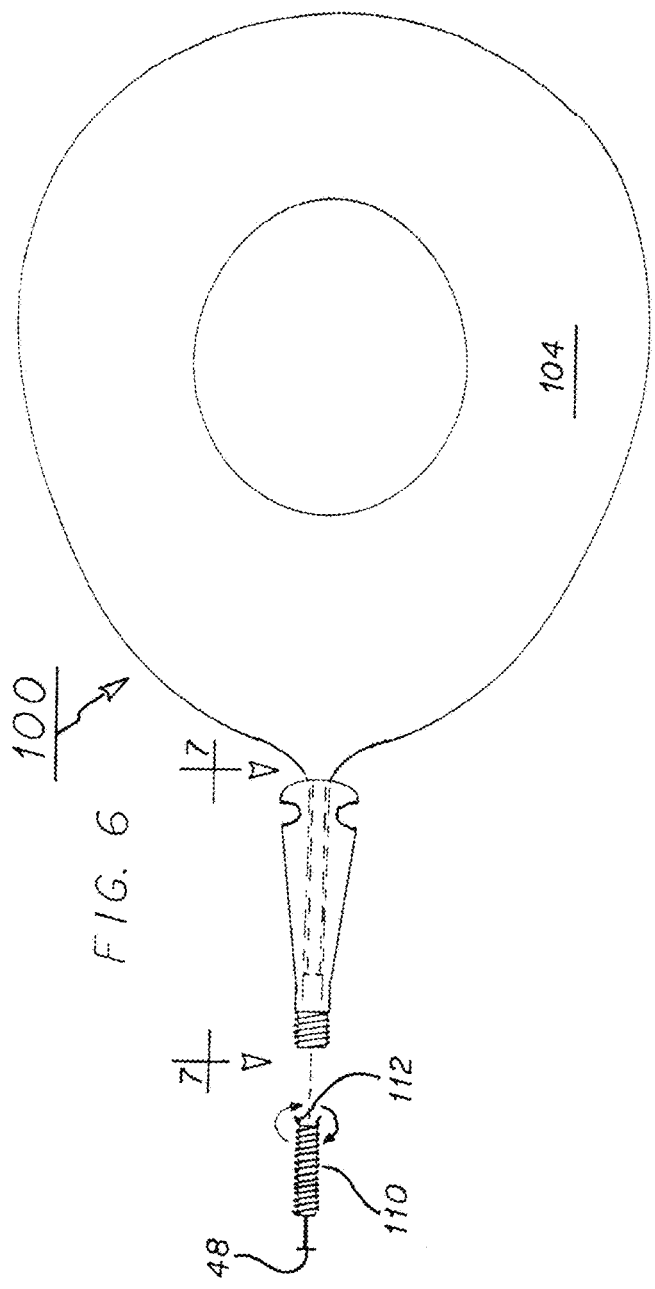
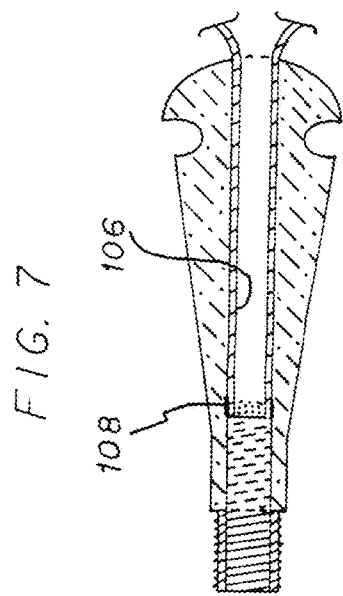

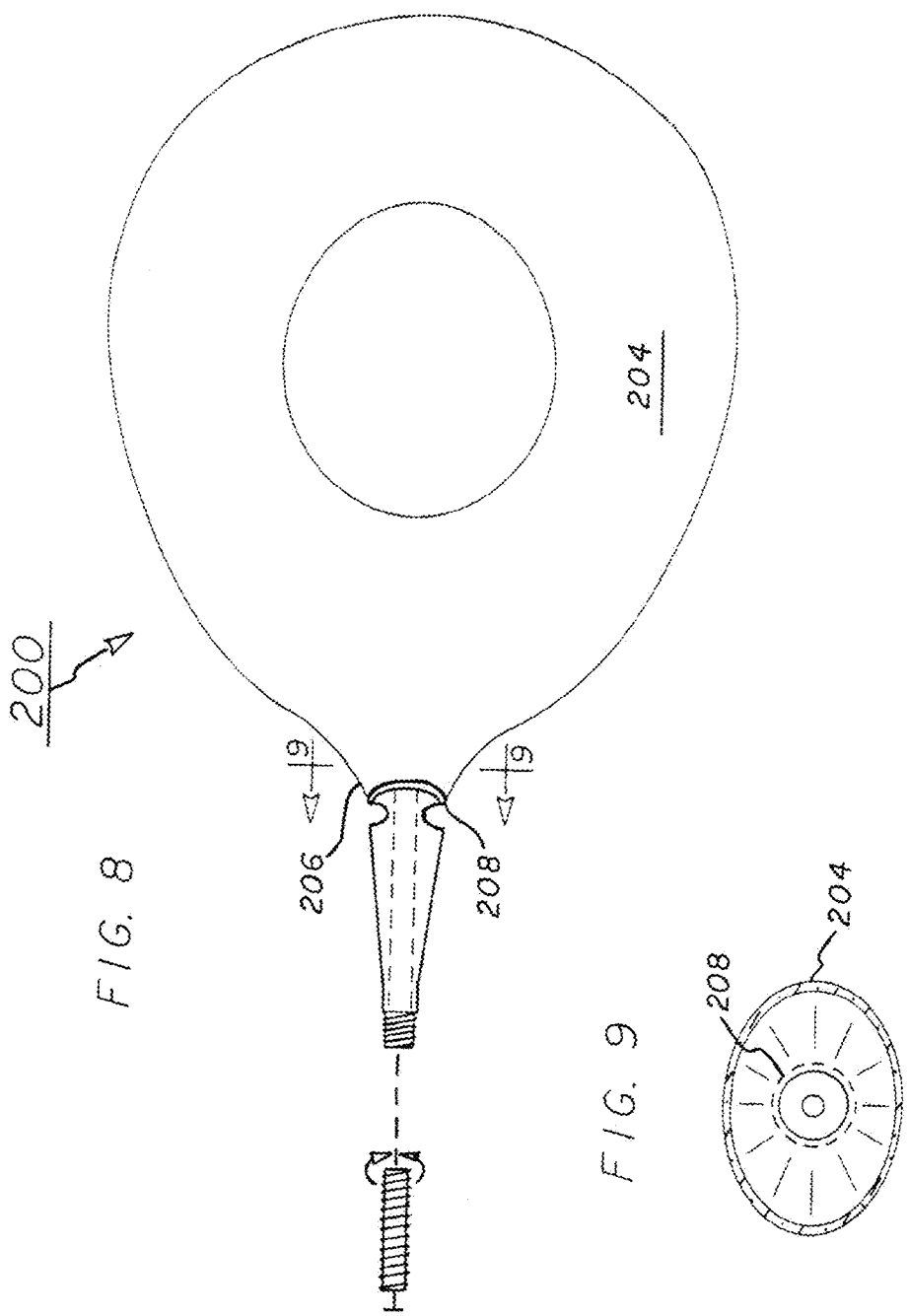

TIRE PRE-INFLATOR SYSTEM

CROSS REFERENCE TO RELATED APPLICATIONS

The present application claims priority to provisional patent application Ser. No. 61/843,563, filed Jul. 8, 2013 and entitled Pre-Inflator System, the contents of each of which are relied upon and incorporated herein by reference.

BACKGROUND OF THE INVENTION

The present invention relates to a tire pre-inflator system and more particularly pertains to inflating and seating a tire on a rim, the tire being of the type which may have been deformed through transportation, storage and the like, the inflating and the seating being done in a safe, time-efficient, convenient and economical manner.

DESCRIPTION OF THE PRIOR ART

The use of tire inflation systems of known designs and configurations is known in the prior art. More specifically, tire inflation systems of known designs and configurations previously devised and utilized for the purpose of inflating and seating tires on rims are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a pre-inflator system that allows for inflating and seating a tire on a rim, the tire being of the type which may have been deformed through transportation, storage and the like, the inflating and the seating being done in a safe, time-efficient, convenient and economical manner.

In this respect, the pre-inflator system according to the present invention substantially departs from the conventional concepts and designs of the prior art, and in doing so provides an apparatus primarily developed for the purpose of inflating and seating a tire on a rim.

Therefore, it can be appreciated that there exists a continuing need for a new and improved pre-inflator system which can be used for inflating and seating a tire on a rim. In this regard, the present invention substantially fulfills this need.

SUMMARY OF THE INVENTION

In view of the foregoing disadvantages inherent in the known types of tire inflation systems of known designs and configurations now present in the prior art, the present invention provides an improved pre-inflator system. As such, the general purpose of the present invention, which will be described subsequently in greater detail, is to provide a new and improved pre-inflator system and method which has all the advantages of the prior art and none of the disadvantages.

To attain this, in some embodiments, the present invention essentially comprises a pre-inflator system comprising a valve stem having inner and outer ends, an exterior surface and an interior passageway. The exterior surface is formed with an annular groove adapted to be received in a rim of a wheel. A valve core has first and second ends.

The valve core is received in the passageway adjacent to the outer end. The valve core has a terminal end axially reciprocable within the second end to facilitate the flow of pressurized air there through. A pre-inflator includes one or more bladders. In some embodiments, the pre-inflator includes an arcuate bladder and a central nozzle. The arcuate bladder may be positioned within a tire. Other embodiments may include two or more oval or round bladders positioned within the tire to be mounted. In some embodiments, a pre-inflator may include a valve stem insert. The valve stem insert will also include an outer end and an inner end, the inner end will be attached to one or more bladders, one or more of said bladders being capable of being expanded with a gas or liquid which may be inserted into the outer end.

A nozzle is positioned within the valve stem at the inner end. The nozzle has an open end for the receipt of air, nitrogen, water or other gas or liquid to inflate the bladder and seat the tire on the rim. The arcuate bladder include one or more of: C-shaped, 0-shaped Y shaped, a series of two or more ovals or round bladders strung together with an passage for gas or air therebetween, a generally tubular shape, or any size and shape suitable for expansion within a tire sufficient to place the tire in close enough proximity to the tire rim to allow a tire bead included along an inner perimeter of the tire to be mounted on the rim.

There has thus been outlined, rather broadly, the more important features of the invention in order that the detailed description thereof that follows may be better understood and in order that the present contribution to the art may be better appreciated.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved pre-inflator system which has all of the advantages of the prior art tire inflation systems of known designs and configurations and none of the disadvantages.

It is another object of the present invention to provide a new and improved pre-inflator system which may be easily and efficiently manufactured and marketed.

It is further object of the present invention to provide a new and improved pre-inflator system which is of durable and reliable constructions. An even further object of the present invention is to provide a new and improved pre-inflator system which is susceptible of a low cost of manufacture with regard to both materials and labor, and which accordingly is then susceptible of low prices of sale to the consuming public, thereby making such pre-inflator system economically available to the buying public.

Lastly, another object of the present invention is to provide a pre-inflator system for inflating and seating a tire on a rim, the tire being of the type which may have been deformed through transportation, storage and the like, the inflating and the seating being done in a safe, time-efficient, convenient and economical manner. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a tire seated and inflated with the pre-inflator system of the present invention.

FIG. 2 is an exploded view of the pre-inflator system prior to use.

FIGS. 3 and 4 are cross sectional views taken along lines 3-3 and 4-4 of FIG. 2.

FIG. 5 is a cross sectional view taken along line 5-5 of FIG. 1.

FIGS. 5A and 5B are cross sectional views similar to FIG. 5 but with the tire becoming increasingly seated and inflated.

FIG. 6 is an exploded view similar to FIG. 2 but illustrating an alternate embodiment of the invention.

FIG. 7 is an elevational view taken along line 7-7 of FIG. 6.

FIG. 8 is an exploded view similar to FIGS. 2 and 6 but illustrating a second alternate embodiment of the invention.

FIG. 9 is a cross sectional view taken along line 9-9 of FIG. 8.

The same reference numerals refer to the same parts throughout the various Figures.

DESCRIPTION OF THE PREFERRED EMBODIMENT

Figure 10:
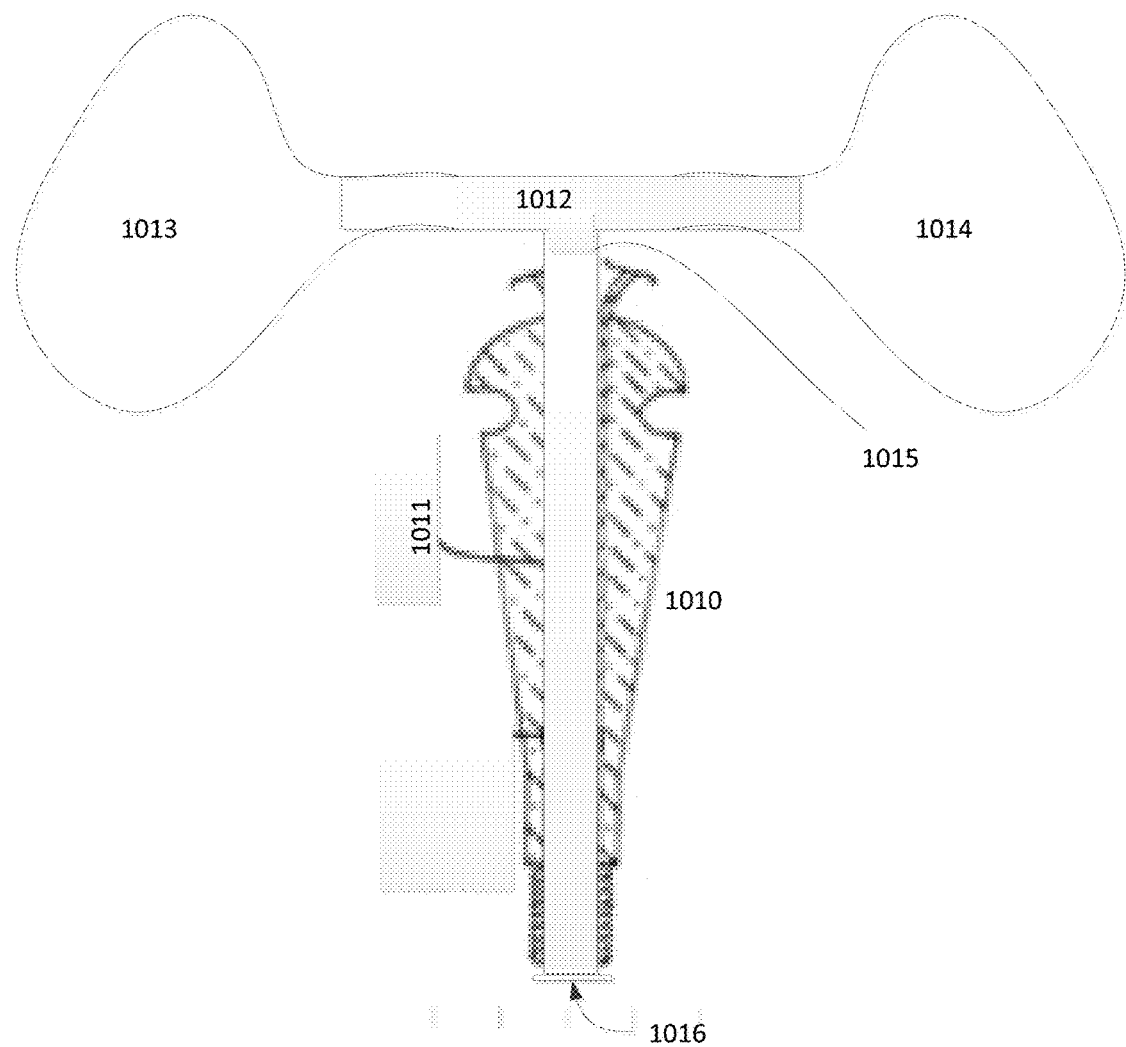
FIG. 10 is an illustration of a tire stem insert for providing a passageway for one or both of a gas and a liquid into a bladder.

The present invention provides apparatus and methods for inflating a tire on a trim with one or more bladders that are inflated within an interior space between the tire and the rim, wherein the one or more bladders may be expanded to push the tire outwards into contact with the tire rim and allows a bead along a perimeter of the tire to seal against the tire rim. Expansion of the bladder be caused by inflating the one or both of a gas and a liquid. A gas may include, for example, ambient air or bottled nitrogen, a liquid may include water or an aqueous solution, such as water with a lubricant or tire sealant.

With reference now to the drawings, and in particular to FIG. 1 thereof, some embodiments of the new and improved pre-inflator system embodying the principles and concepts of the present invention and generally designated by the reference numeral 10 will be described.

The present invention, the pre-inflator system 10 is comprised of a plurality of components. Such components in their broadest context include a valve stem, valve core and pre-inflator. Such components are individually configured and correlated with respect to each other so as to attain the desired objective.

The primary embodiment of the pre-inflator system 10 for inflating and seating a tire 12 on a rim 14 is illustrated in FIGS. 1 through 5. The tire is of the type which may have been deformed through transportation, storage and the like. The inflating and the seating are done in a safe, time-efficient, convenient and economical manner, the system comprising. The primary embodiment includes the rim 14 formed in a Y-shaped cross sectional configuration. The rim has a center 16 formed as a circular opening with a large diameter. The rim has an exterior 18 formed of two spaced free ends. The rim forms a radially interior chamber 20 with an annular configuration. An aperture 22 with a small diameter is formed in the rim adjacent to one of the two spaced free ends.

Next provided is a valve stem 26. The valve stem has an inner end 28 and an outer end 30. The valve stem has a generally cone-shaped exterior surface and a cylindrical interior passageway. The exterior surface of the valve stem is formed with an annular groove 32 adjacent to the interior end. The groove is received and supported in the aperture of the rim whereby the inner end of the valve stem is located within the interior chamber of the rim and whereby the outer end of the valve stem is located outside of the interior chamber of the rim. Male screw threads 34 are in the exterior surface adjacent to the inner end of the valve stem. Female threads 36 are formed in the passageway.

Next provided is a valve core 40. The valve core has a main body portion with a first end 42 and a second end 44 and a threaded surface 46 therebetween. The valve core is inserted into the end of the valve stem. The threaded surface is threadedly received in the female threads of the passageway adjacent to the outer end of the valve stem. The valve core has a terminal end 48 axially reciprocable within the second end of the main body portion. The terminal end is adapted to allow the flow of pressurizing air, nitrogen, water or other gas or liquid through the valve stem when depressed. The terminal end is adapted to preclude the flow of pressurizing air through the valve stem when released.

The tire has side walls, a tread portion, and two beads 54. The two beads are positioned in proximity to the rim adjacent to the free ends to form with the interior chamber a major chamber 56.

A pre-inflator 60 is next provided. The pre-inflator has a C-shaped bladder 62 with two arcuate sections and a central nozzle 64. The arcuate sections are positioned within the major housing. The nozzle is positioned within the valve stem at the inner end. The nozzle has an open end 66 for the receipt of air to inflate the pre-inflator. The pre-inflator is fabricated of an elastomer chosen from the class of elastomers including plastic and rubber, natural and synthetic, and blends thereof.

Lastly in the primary embodiment, an inflation needle 70 is provided. The inflation needle is temporarily positioned in the exterior end of the valve stem prior to the insertion of the valve core into the valve stem. The inflation needle is adapted to facilitate the flow of air into the bladder and tire to be pre-inflated and seated on the rim through the flow of pressurized air through the valve stem, nozzle and arcuate sections. The inflation needle is adapted to be removed from the valve stem and replaced with the valve core to facilitate the flow of air into the tire to be finally inflated through the flow of pressurized air into the tire.

From a generic view point, the invention is a pre-inflator system comprising a valve stem having inner and outer ends. The valve stem having an exterior surface and an interior passageway. The exterior surface is formed with an annular groove adapted to be received in a rim of a wheel. A valve core has first and second ends. The valve core is received in the passageway adjacent to the outer end. The valve core has a terminal end axially reciprocable within the second end to facilitate the flow of pressurized air there through. In some embodiments, a pre-inflator may include an arcuate bladder and a central nozzle. The arcuate bladder is positioned within a tire. The nozzle is positioned within the valve stem at the inner end. The nozzle has an open end for the receipt of air to inflate the bladder and seat the tire on the rim. The arcuate bladder is C-shaped or 0-shaped.

An alternate embodiment of the invention is illustrated in FIGS. 6 and 7. In this embodiment of the system 100, the bladder 104 is 0-shaped. Further, the nozzle 106 is inserted into the valve stem from the interior end. Included in this embodiment is glue 108 attaching the nozzle to the valve stem at an interior-most portion of the nozzle. In this embodiment, the valve core 110 is formed with cutters 112 extending interiorly from the first end of the valve core for cutting the nozzle and separating the bladder from the valve stem. A second alternate embodiment of the invention is illustrated in FIGS. 8 and 9. In this embodiment of the system 200, the bladder 204 is 0-shaped. Further, the nozzle 206 extends over the interior end of the valve stem. In this embodiment, glue 208 permanently couples the pre-inflator to the valve stem.

Referring now to FIG. 10, a valve stem is illustrated with a bladder filling insert 1011 included within the valve stem 1010. The bladder filling insert 1011 essentially includes a passageway 1012 through the valve stem 1010 to convey one or both of a gas or liquid (not illustrated). The bladder filling insert 1011 provides such a passageway 1012 to one or more bladders 1013-1014. In some preferred embodiments, the passageway provides one or both of gaseous and liquid communication from a point external to the valve stem to the interior of the bladder.

A gas and/or liquid introduced under pressure into an opening 1016 in the bladder filling insert 1011 may be passed through the passageway to the one or more bladders 1013-1014 and cause the bladders 1013-1014 to expand.

As the bladder 1013-1014 expands, it will provide outward pressure against a tire into which the one or more bladders 1013-1014 have been placed and cause the tire bead to be proximate to and/or in contact with a tire rim onto which the tire has been mounted.

Figure 11:
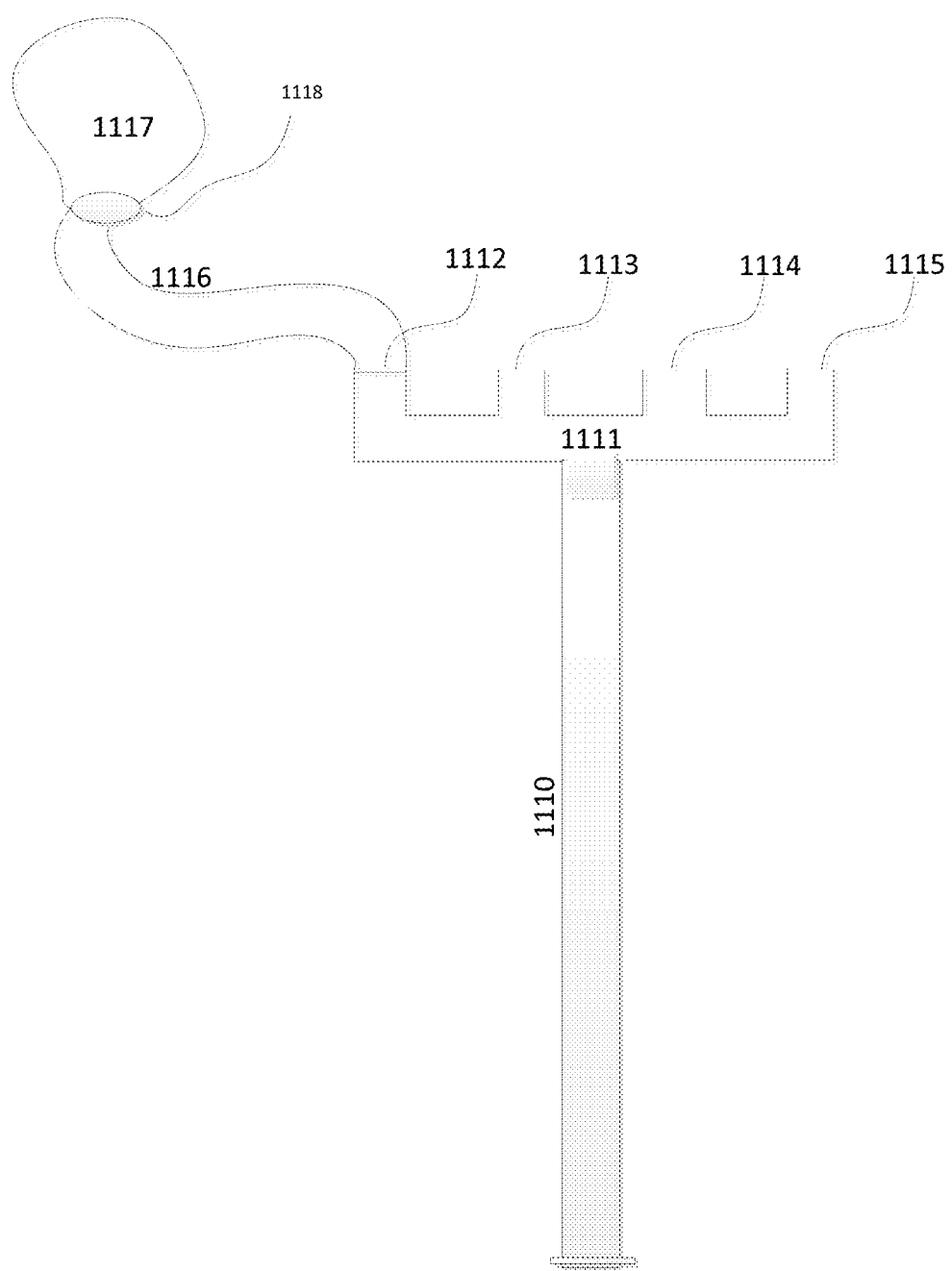
FIG. 11 is a bladder filling insert with two or more manifold openings.

Referring now to FIG. 11, in some embodiments, a bladder filling insert 1110 may be connected to a manifold 1111 with two or more manifold openings 1112-1115. One or more manifold openings 1112-1115 may be used to introduce one or both of a gas and a liquid to expand a bladder 1117. In some embodiments, a tube 1116, or other passageway, may be used to convey one or both of a gas and a liquid to a bladder from the manifold opening 1112-1115. The tube 1116 may of appropriate length and diameter to position a bladder 1117 within a tire in proximity to a rim, such as, for example, around a circumference formed by the rim.

The use of a manifold 1111 and a tube 1116 allows for flexibility in a number of bladders used to mount a tire and also the position of the bladders within the tire to be mounted.

In another aspect of the present invention, in some embodiments a valve mechanism 1118 may be included to allow one or both of a gas and a liquid to enter one of the respective multiple bladders and prevents or inhibits the one or both of liquid and gas from escaping the one of the respective multiple bladders. The valve mechanism 1118 may include for example a flapper valve commonly used in the art.

Figure 12:
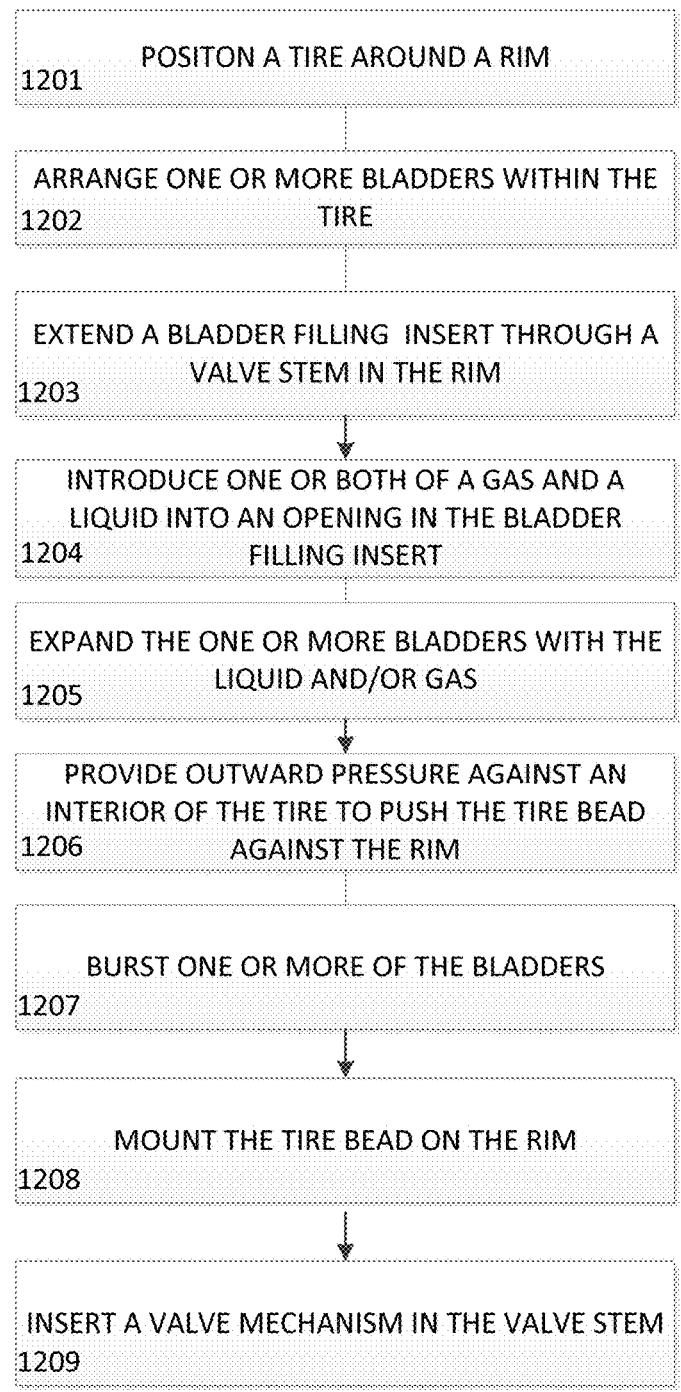
FIG. 12 is a diagram of method steps that may be implemented in practicing some embodiments of the present invention.

Referring now to FIG. 12, some method steps are listed that may be implemented in practicing some embodiments of the present invention. The steps are listed in an order for discussion and are not meant limit the scope or practice of the claimed invention. As illustrated, at 1201 a tire is positioned around a rim and at 1202 one or more bladders are arranged with the tire. At 1203, a bladder filling insert is extended through a valve stem positioned in the rim. At 1204, one or more of a gas and a liquid are introduced into an opening in the bladder filling insert and passed through the bladder filling insert into the one or more bladders. The bladders may be expanded until they apply outward pressure on the tire thereby causing the tire bead to come into contact with the tire rim.

Additional outward pressure may be applied on the bladder via the introduction of one or both of a gas and a liquid into the bladder and the tire bead may be mounted on the rim 1208. Preferred embodiments include the introduction of ambient air into the bladder. Preferred embodiments may also include the introduction of nitrogen or water into the bladder. In some embodiments, as illustrated at 1207, the pressure from the introduced gas and/or liquid may cause one or more of the bladders to burst. According to the present invention, the burst bladder will not prohibit the tire bead from mounting on the rim. Additional pressure introduced into the valve stem and the bladder filling insert will cause the tire bead to mount on the tire rim if it has not already done so.

At 1209, a valve mechanism may be inserted into the valve stem to maintain pressure within the tire mounted on the tire rim via the tire bead contact with the tire rim. The tire valve may be used to maintain a proper amount of pressure within the tire. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed in the following claims.

What is claimed is:

1. Apparatus for mounting a tire on a tire rim, the apparatus comprising:
   a bladder locatable within an unmounted tire wherein the tire is placed proximate to a tire rim with the tire generally positioned concentrically around the rim;
   a bladder filling insert placed within a valve stem fixedly attached to the tire rim, the bladder filling insert providing one or both of gaseous and liquid communication from a point external to the valve stem to the interior of the bladder;
   a manifold attached to the bladder filling insert and allowing one or both of gaseous and liquid communication from the bladder filing insert to multiple bladders;
   a tube providing one or both of liquid communication and gaseous communication between the manifold and one of the multiple bladders; and, a mechanism allowing one or both of a gas and a liquid to enter one of the respective multiple bladders and prevents or inhibits the one or both of liquid and gas from escaping the one of the respective multiple bladders.

2. The apparatus of claim 1, wherein the bladder is suitable to contain a gas introduced into the bladder comprising ambient air.

3. The apparatus of claim 1, wherein the bladder is suitable to contain a gas introduced into the bladder comprising nitrogen.

4. The apparatus of claim 1, wherein the bladder is suitable to contain a liquid introduced into the bladder comprising water.

5. The apparatus of claim 1, wherein the bladder is suitable to contain a liquid introduced into the bladder comprising an aqueous solution additionally comprising a lubricant.

6. The apparatus of claim 1, wherein the liquid introduced into the bladder filling insert comprises an aqueous solution additionally comprising a tire sealant.

7. The apparatus of claim 1, wherein the mechanism allowing one or both of a gas and a liquid to enter one of the respective multiple bladders and prevents or inhibits the one or both of liquid and gas from escaping the one of the respective multiple bladders comprises a flapper valve.

* * * * *